US012585261B2

(12) United States Patent
Ogiso et al.

(10) Patent No.: US 12,585,261 B2
(45) Date of Patent: Mar. 24, 2026

(54) MACHINING SIMULATION DEVICE AND MACHINING SIMULATION METHOD

(71) Applicant: FANUC CORPORATION, Minamitsuru-gun (JP)

(72) Inventors: Tarou Ogiso, Yamanashi (JP); Tomonobu Suzuki, Yamanashi (JP); Kojiro Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/874,900

(22) PCT Filed: Apr. 24, 2023

(86) PCT No.: PCT/JP2023/016159
§ 371 (c)(1),
(2) Date: Dec. 13, 2024

(87) PCT Pub. No.: WO2024/224457
PCT Pub. Date: Oct. 31, 2024

(65) Prior Publication Data
US 2025/0164979 A1     May 22, 2025

(51) Int. Cl.
G05B 19/418          (2006.01)
(52) U.S. Cl.
CPC ................. G05B 19/41885 (2013.01); G05B 2219/33301 (2013.01)
(58) Field of Classification Search
CPC .... G05B 19/41885; G05B 2219/33301; G05B 2219/36252; G05B 19/4069; B23Q 17/00
(Continued)

(56) References Cited

U.S. PATENT DOCUMENTS

| | | | | |
|---|---|---|---|---|
| 6,662,073 B1 * | 12/2003 | Fujishima | .......... | G05B 19/4069 700/109 |
| 2004/0225484 A1 * | 11/2004 | Hamann | ............ | G05B 19/4069 700/83 |
| 2017/0262573 A1 | 9/2017 | Mori et al. | | |

FOREIGN PATENT DOCUMENTS

| | | | |
|---|---|---|---|
| CN | 110291469 A | | 9/2019 |
| CN | 113467367 A | * | 10/2021 |

(Continued)

OTHER PUBLICATIONS

Washita et al., "Study of Low-Frequency Vibration Suppression Control by Two-Inertia System Model for Feed Axis of NC Machine Tool", Journal of the Japan Society for Precision Engineering vol. 82. No. 8, 2016. (Year: 2016).*

(Continued)

*Primary Examiner* — Vincent H Tran
*Assistant Examiner* — Michael Tang
(74) *Attorney, Agent, or Firm* — Wenderoth, Lind & Ponack, L.L.P.

(57)          ABSTRACT

The present disclosure provides a machining simulation device capable of obtaining a machine-tool transfer function without requiring data collection and expert knowledge. The machining simulation device includes: a transmission characteristic generation unit that generates a transmission characteristic of a machine tool; and a simulation execution unit that simulates behavior of the machine tool by using the transmission characteristic. The transmission characteristic generation unit includes: a control information acquisition unit that acquires motor information and a control parameter of a motor control system of the machine tool; a motor characteristic calculation unit that calculates a motor characteristics based on the motor information; a control characteristic calculation unit that calculates a control characteristic of the motor control system on the basis of the (Continued)

control parameter; and a transmission characteristic calculation unit that calculates the transmission characteristic satisfying a predetermined requirement on the basis of the motor characteristic and the control characteristic.

8 Claims, 7 Drawing Sheets

(58) Field of Classification Search
    USPC ........................................................ 700/159
    See application file for complete search history.

(56)                    References Cited

FOREIGN PATENT DOCUMENTS

| | | | |
|---|---|---|---|
| DE | 102020205031 | A1 | 10/2021 |
| JP | 5-207769 | | 8/1993 |
| JP | 7-110716 | | 4/1995 |
| JP | 2001-51708 | | 2/2001 |
| JP | 2002-278609 | | 9/2002 |
| JP | 2013-55751 | | 3/2013 |
| JP | 2019-152936 | | 9/2019 |
| KR | 20190043038 | A * | 4/2019 |
| KR | 2020-0056635 | A | 5/2020 |
| WO | 02/03155 | | 1/2002 |
| WO | WO-2020003738 | A1 * | 1/2020 |
| WO | 2020/217597 | | 10/2020 |

OTHER PUBLICATIONS

International Search Report issued Jun. 27, 2023 in corresponding International Application No. PCT/JP2023/016159.
Office Action issued Sep. 19, 2023 in corresponding Japanese Application No. 2023-541659 (with machine translation).

* cited by examiner

MOTOR INERTIA          LOAD INERTIA

MOTOR INERTIA          LOAD INERTIA

SPRING

MACHINING SIMULATION DEVICE AND MACHINING SIMULATION METHOD

TECHNICAL FIELD

The present disclosure relates to a machining simulation device and a machining simulation method, and more specifically, to a machining simulation device and a machining simulation method for simulating the behavior of a machine tool using a transfer function that represents the transfer characteristic of the machine tool.

BACKGROUND ART

Techniques for simulating the behavior of a machine tool using a transfer function that represents the transfer characteristic of the machine tool are disclosed in Patent Documents 1 through 4.

Patent Document 1 discloses a numerical control method that allows for machining in a short time without causing damage on the machining surface, even when the command path includes an error. Specifically, Patent Document 1 discloses a numerical control method that predicts a path of a machining tool, based on the transfer characteristics from the command position to the machining position in a case where the velocity of the machine tool is controlled by the command path and commanded feed rate specified in the machining program. The method calculates the allowable feed rate, based on the characteristic quantities representing the temporal changes in the position of the machining tool along the predicted path and the allowable values thereof. The characteristic quantities include the acceleration or the normal component of acceleration of the machining tool along the predicted path.

Patent Document 2 discloses a machining simulation device that prevents the occurrence of chatter caused by resonance and improves surface accuracy, etc. Specifically, Patent Document 2 discloses a machining simulation device that executes a machining simulation on graphic data prior to actual machining, simulating the frequency of forced vibrations caused by intermittent cutting and/or the frequency of load fluctuations, based on machining information using machining simulation means. Based on the frequency acquired from the simulation, a numerical control command is generated by numerical control command creation means. Patent Document 2 also discloses that the machining simulation device allows for reflecting the spindle rotation velocity in the actual machining and in the creation of the machining program under conditions suited to actual machining. As a result, the frequency of forced vibrations caused by intermittent cutting and/or the frequency of load fluctuations or the harmonic frequencies do not approach the natural vibration frequency of the machine, tool, jig, or workpiece, thereby preventing the occurrence of chatter caused by resonance.

Patent Document 3 discloses a processing method that allows for acquiring correction data in a short time. Specifically, Patent Document 3 discloses a processing method for machining a non-circular workpiece, in which the profile data of the non-circular workpiece is separated into data for the workpiece spindle and the tool feed shaft, and each data set is Fourier transformed. A first step executes a Fourier transform on each data and calculates the gain and phase for each frequency. A second step calculates the gain and phase for each frequency, based on the transfer function of the contour machining spindle device and the transfer function of the tool feed shaft device. A third step adds the gain and phase for each frequency acquired in the second step to the gain and phase for each frequency acquired in the first step for the workpiece spindle and the tool feed shaft. A fourth step executes an inverse Fourier transform on the frequency data for the workpiece spindle and the tool feed shaft of the non-circular workpiece acquired in the third step. A fifth step creates correction data, which is the machining data for the workpiece spindle and the tool feed shaft of the non-circular workpiece acquired in the fourth step, Machining of the non-circular workpiece is then executed based on the correction data.

Patent Document 4 discloses a machining simulation device for a machine tool, in which machining simulation can be executed with high accuracy while suppressing an increase in time. Specifically, Patent Document 4 discloses a machining simulation device that simulates the machining of a workpiece by a machine tool, based on a machining program, using the tool to machine the workpiece. The apparatus includes: a machine simulation unit that estimates the position of the tool by simulating the motion of the machine tool, based on the position commands and the transfer characteristics of the machine tool when operating in accordance with the machining program; and a machining simulation unit that simulates the machining of the workpiece, based on the tool information and the estimated position of the tool.

CITATION LIST

Patent Document

Patent Document 1: Japanese Unexamined Patent Application, Publication No. 2001-051708
Patent Document 2: PCT International Publication No. WO 2002/003155
Patent Document 3: Japanese Unexamined Patent Application, Publication No. 2002-278609
Patent Document 4: Japanese Unexamined Patent Application, Publication No. 2019-152936

DISCLOSURE OF THE INVENTION

Problems to be Solved by the Invention

In order to execute a machining simulation, obtaining the transfer function of a machine tool requires data collection accompanied by a trial operation of the machine tool and specialized knowledge to analyze the collected data and calculate the transfer characteristic. Therefore, it is desirable to obtain the transfer function of a machine tool without requiring data collection accompanied by a trial operation or specialized knowledge to calculate the transfer characteristic.

Means for Solving the Problems

A representative first aspect of the present disclosure is a machining simulation device, which includes: a transfer characteristic generation unit that generates a transfer characteristic of a machine tool; and a simulation execution unit that simulates behavior of the machine tool using the transfer characteristic. The transfer characteristic generation unit includes: a control information acquisition unit that acquires control information, including motor information of the machine tool and a control parameter of a motor control system of the machine tool, from a storage unit; a motor characteristic calculation unit that calculates a motor characteristic, based on the motor information; a control characteristic calculation unit that calculates a control characteristic of the motor control system, based on the control parameter; and a transfer characteristic calculation unit that calculates the transfer characteristic satisfying a predetermined requirement, based on the motor characteristic and the control characteristic. The predetermined requirement includes at least one of a response frequency of position control, a response frequency of velocity control, a natural frequency of the machine tool, or a resonance frequency between a driving unit and a driven unit of the machine tool.

A representative second aspect of the present disclosure is a machining simulation method causing a computer to execute processing of: calculating a motor characteristic, based on motor information of a machine tool; calculating a control characteristic of a motor control system, based on a control parameter of the motor control system of the machine tool; calculating a transfer characteristic satisfying a predetermined requirement, based on the motor characteristic and the control characteristic; and simulating behavior of the machine tool using the transfer characteristic. The predetermined requirement includes at least one of a response frequency of position control, a response frequency of velocity control, a natural frequency of the machine tool, or a resonance frequency between a driving unit and a driven unit of the machine tool.

PREFERRED MODE FOR CARRYING OUT THE INVENTION

Figure 1:
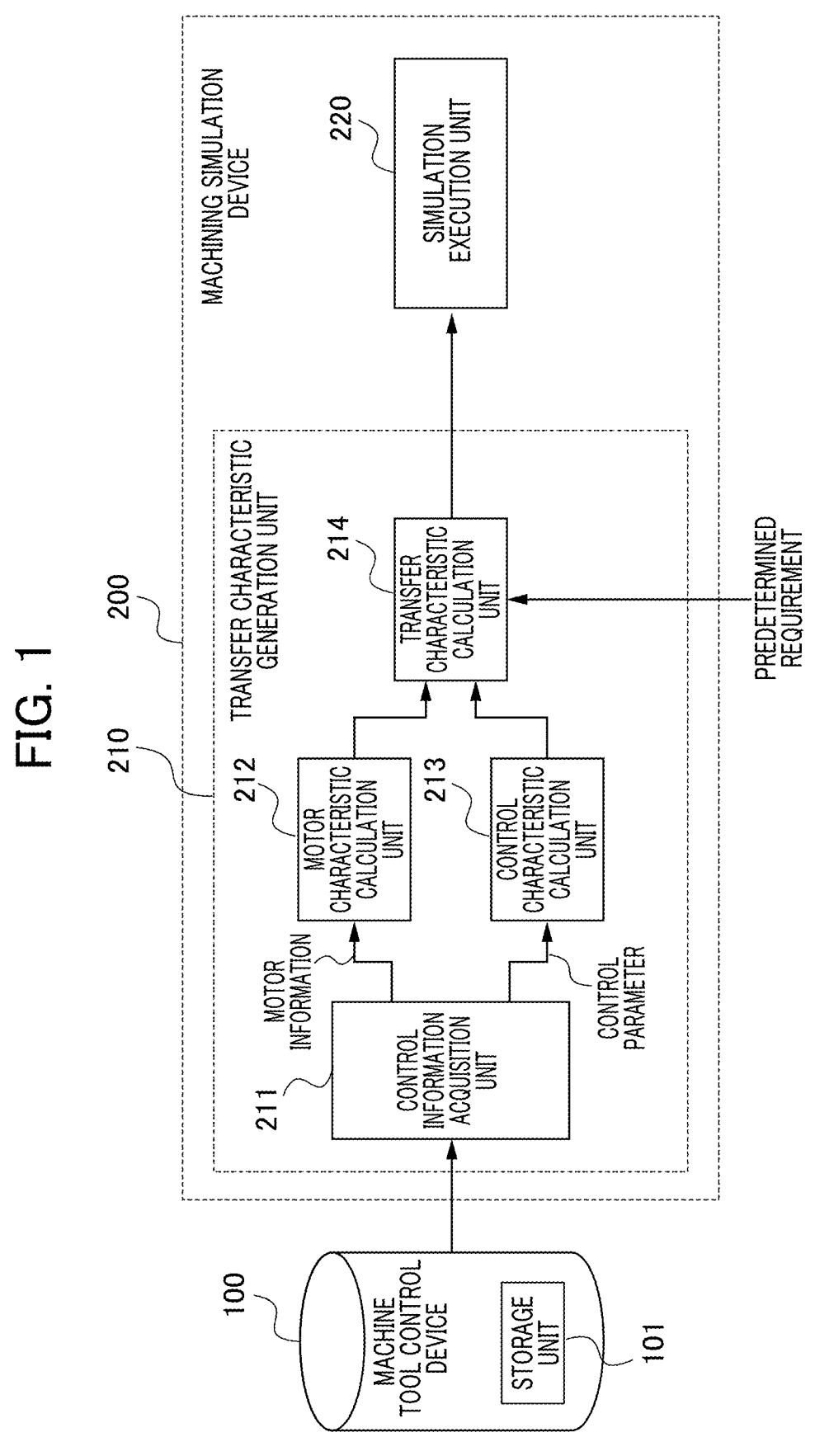
FIG. 1 is a configuration diagram illustrating an example of the configuration of a machining simulation system for a machine tool according to one embodiment of the present invention.

Hereinafter, an embodiment of the present disclosure will be described in detail with reference to the drawings. FIG. 1 is a configuration diagram illustrating an example of the configuration of a machining simulation system for a machine tool according to one embodiment of the present invention.

As illustrated in FIG. 1, the machining simulation system 10 for a machine tool includes a machine tool control device 100, and a machining simulation device 200.

The machine tool control device 100 controls the movement of the feed shaft and the rotation of the main shaft of the machine tool, based on a machining program. The control device 100 includes a motor, which serves as the driving unit of the machine tool, a driven unit, and a motor control system that controls the motor. The control device 100 stores motor information of the machine tool and a control parameter of the motor control system in a storage unit 101, The motor information and the control parameter will be described later. The motor information of the machine tool and the control parameter may be stored in a storage unit separate from the control device 100. The storage unit may be provided within the machining simulation device 200. In a case where the storage unit is provided separately from the control device 100, the machining simulation system 10 may not include the machine tool control device 100.

Figure 4:
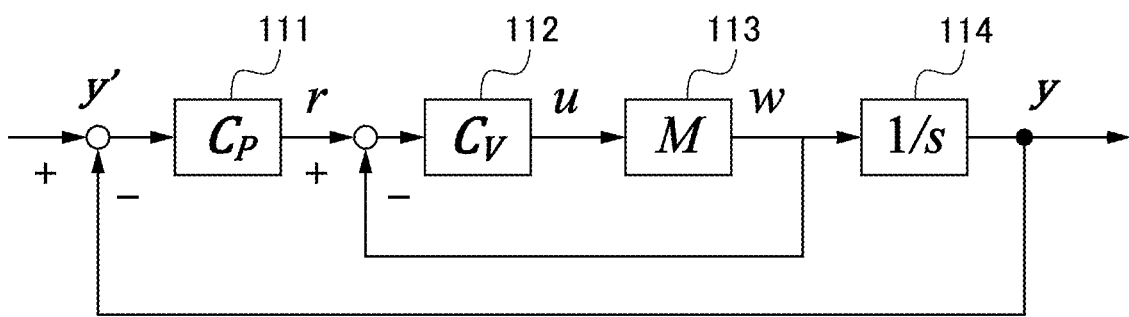
FIG. 4 is a block diagram illustrating the configuration of a position control loop when the motor control system, the driving unit, and the driven unit form a position control loop.

The machining simulation device 200 includes a transfer characteristic generation unit 210 and a simulation execution unit 220. The transfer characteristic generation unit 210 calculates the transfer function of the machine tool using the motor information and the control parameter obtained from the storage unit 101 of the machine tool control device 100. The simulation execution unit 220 uses the calculated transfer function to simulate the control executed by the machine tool control device 100, based on the machining program, the behavior of the motor as the driving unit and the driven unit, and the feedback control of the control device 100, based on the position information of the driving unit and the driven unit (for example, the position control loop described later as illustrated in FIG. 4), and outputs the position information for each shaft as simulation results.

The transfer characteristic generation unit 210 includes a control information acquisition unit 211, a motor characteristic calculation unit 212, a control characteristic calculation unit 213, and a transfer characteristic calculation unit 214. Each configuration of the transfer characteristic generation unit 210 will be described below.

(Control Information Acquisition Unit 211)

The control information acquisition unit 211 acquires control information, including motor information and a control parameter, from the storage unit 101 of the machine tool control device 100. The motor information includes, for example, at least one of motor inertia, the inertia ratio, or the spring constant, all caused by the motor. The inertia ratio refers to the ratio of load inertia to motor inertia. Load inertia is also referred to as load inertia. Motor inertia may also include the inertia of the reducer and the ball screw. The control parameter includes, for example, at least one of the position control proportional gain $K_P$ of the position control unit included in the motor control system of the control device 100, the velocity loop gain $K_V$, the velocity control integral gain $K_1$ of the velocity control unit, or the velocity control proportional gain $K_2$ of the velocity control unit. The storage unit 101 may store motor inertia as part of the specification or motor characteristic database. In this case, the control information acquisition unit 211 acquires information that allows for identifying the motor, such as the motor model, from the storage unit 101 and references the specification or motor characteristic database to acquire the motor inertia.

(Motor Characteristic Calculation Unit 212)

Figure 2:
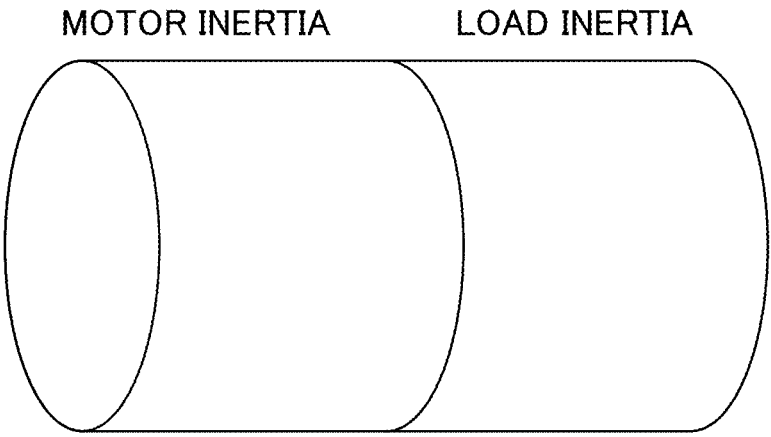
FIG. 2 is a diagram illustrating the driving unit and the driven unit of a machine tool using a rigid body model.

The motor characteristic calculation unit 212 calculates a motor characteristic, based on motor information. When the mechanical model of the motor, which serves as the driving unit of the machine tool, and the driven unit is represented by the rigid-body system model illustrated in FIG. 2, and the motor information includes motor inertia $J_M$ and inertia ratio R, the motor characteristic $M_1$ is given by the transfer function in Equation 1 (hereinafter referred to as "Equation 1"). Here, s represents the Laplace transform variable.

$$M_1(s) = \frac{1}{(1+R)J_M s} \qquad \text{[Equation 1]}$$

When the mechanical model of the motor, which serves as the driving unit of the machine tool, and the driven unit is represented by the two-inertia system model illustrated in FIG. 3, and the motor information includes motor inertia $J_M$, natural frequency $\omega_O$, and resonance frequency $\omega_P$, the motor characteristic $M_2$ is given by the transfer function in Equation 2 (hereinafter referred to as "Equation 2").

$$M_2(s) = \frac{1}{J_M s} \frac{(s^2 + \omega_O^2)}{(s^2 + \omega_P^2)} \qquad \text{[Equation 2]}$$

The natural frequency $\omega_O$ and resonance frequency $\omega_P$ in Equation 2 are given by Equation 3 (hereinafter referred to as "Equation 3") using the motor inertia $J_M$, the inertia ratio R, and the spring constant $K_S$ of the spring element between the motor inertia and the load inertia.

$$\omega_O = \sqrt{\frac{K_S}{R J_M}}, \, \omega_P = \sqrt{\frac{(1+R)K_S}{R J_M}} \qquad \text{[Equation 3]}$$

The natural frequency $\omega_O$ of the two-inertia system model is the natural frequency of free vibration of the driven unit when the driving unit is fixed, and may be referred to as the anti-resonance frequency in some cases. The resonance frequency $\omega_P$ of the two-inertia system model is the frequency at which the driving unit and the driven unit vibrate in opposite phases.

The transfer function of the motor inertia and load inertia connected by a spring element is disclosed, for example, in "A Study on Low Frequency Vibration Suppression Control by Two-Mass System Model for Feed Axes of NC Machine Tools", Yasusuke Iwashita et al., Journal of the Japan Society for Precision Engineering, Vol. 82, No. 8, 2016.

(Control Characteristic Calculation Unit 213)

The control characteristic calculation unit 213 calculates the control characteristic of the motor control system, based on a control parameter. In a case where the motor control system, the driving unit, and the driven unit included in the control device 100 configure a position control loop, the position control loop is represented by the block diagram illustrated in FIG. 4. As illustrated in FIG. 4, the position control loop can be represented by a position control unit 111, a velocity control unit 112, a mechanical model unit 113 consisting of the driving unit and the driven unit, and an integrator 114. In many cases, the position control loop is configured as a dual-loop system with an internal velocity control loop, as illustrated in FIG. 4. In FIG. 4, y' represents the position command, y represents the actual position, r represents the velocity command, u represents the actuation quantity, and w represents the actual velocity. The actuation quantity u is, for example, a torque command; however, for a servo motor, the relationship of torque=$K_T$×current holds via the torque constant $K_T$, thus the actuation quantity u may be considered as current.

Figure 5:
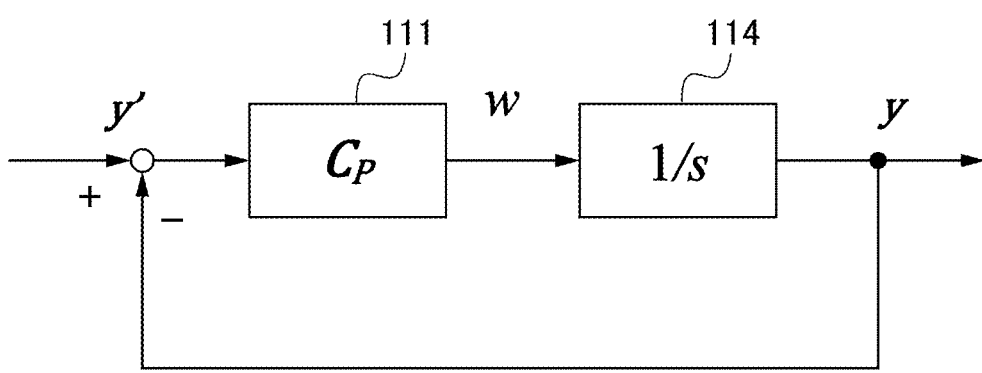
FIG. 5 is a block diagram illustrating the configuration of a simplified position control loop.

Since the response frequency of the position control loop must be lower than the response frequency of the internal velocity control loop, the position control loop can be simplified to the block diagram configuration illustrated in FIG. 4, where the closed-loop transfer function from the velocity command r to the actual velocity w is approximated as 1. In a case where the position control loop is configured as illustrated in FIG. 5, the position control loop consists of the position control unit 111 and the integrator 114, and the motor control system corresponds to the position control unit 111. The control characteristic $C_P$ of the position control unit 111, which serves as the motor control system, is expressed as $C_P=K_P$, and the control parameter is the position control proportional gain $K_P$.

Figure 6:
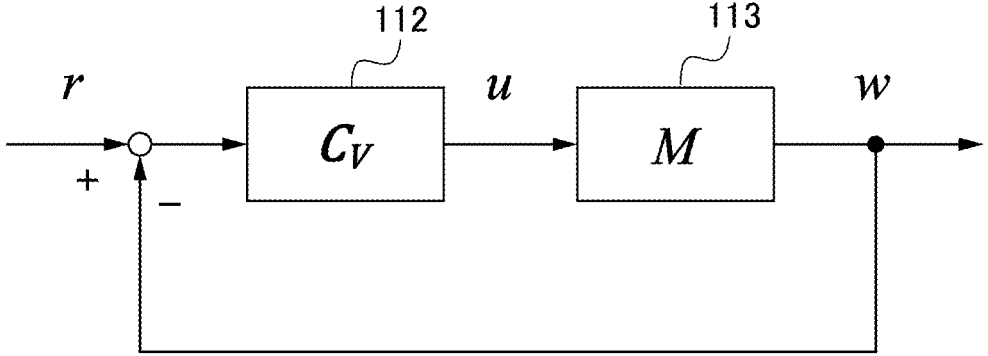
FIG. 6 is a block diagram illustrating the configuration of a velocity control loop when the motor control system, the driving unit, and the driven unit form a velocity control loop.

In a case where the motor control system, the driving unit, and the driven unit included in the control device 100 configure a velocity control loop, the velocity control loop is represented by the block diagram illustrated in FIG. 6. The velocity control loop can be represented by a velocity control unit 112 and a mechanical model unit 113 consisting of the driving unit and the driven unit. The motor control system corresponds to the velocity control unit 112.

The control characteristic $C_V$ of the velocity control unit 112, which serves as the motor control system, in the case of the velocity PI control, is given by Equation 4 (hereinafter referred to as "Equation 4"). In Equation 4, $K_V$ is the velocity loop gain, $K_1$ is the velocity control integral gain, and $K_2$ is the velocity control proportional gain. The control parameters are the velocity loop gain $K_V$, the velocity control integral gain $K_1$, and the velocity control proportional gain $K_2$.

$$C_V(s) = K_V \frac{(K_1 + K_2 s)}{s} \qquad \text{[Equation 4]}$$

In the case of the velocity P control, the control characteristic $C_V$ of the velocity control unit is obtained by setting $K_1=0$ and $K_2=1$ in Equation 4, resulting in $C_V=K_V$. The control parameter is the velocity loop gain $K_V$.

(Transfer Characteristic Calculation Unit 214)

The transfer characteristic calculation unit 214 calculates the transfer characteristic of the machine tool by changing at least one of the motor characteristic calculated by the motor characteristic calculation unit 212 or the control characteristic calculated by the control characteristic calculation unit 213 to satisfy a predetermined requirement. The predetermined requirement includes at least one of the response frequency of position control, the response frequency of velocity control, the natural frequency of the machine tool, or the resonance frequency between the driving unit and the driven unit of the machine tool. The predetermined requirement will be described later. The value of the predetermined requirement may be provided by the user, or may be acquired by the transfer characteristic calculation unit 214 from the storage unit 101 of the control device 100, a storage unit provided outside the control device 100, or a storage unit provided within the machining simulation device.

First, the transfer characteristic of the machine tool will be described. The closed-loop transfer function $G_C$ is expressed as $G_C=G_O/(1+G_O)$, where $G_O$ is the open-loop transfer function.

The transfer characteristic calculation unit 214 calculates the closed-loop transfer function $G_{PC}(s)$ for the position control loop and the closed-loop transfer function $G_{VC}(s)$ for the velocity control loop, as follows. The closed-loop transfer function $G_{PC}(s)$ for the position control loop, where the open-loop transfer function $G_{PC}(s)$ of the position control loop is $G_{PC}(s)=K_P/s$ as illustrated in FIG. 5, is given by Equation 5 (hereinafter referred to as "Equation 5").

$$G_{PC}(s) = \frac{G_{PO}(s)}{(1 + G_{PO}(s))} = \frac{K_P}{(s + K_P)} \qquad \text{[Equation 5]}$$

The closed-loop transfer function $G_{VC}(s)$ for the velocity control loop, in the case of the velocity PI control, is given by Equation 7 (hereinafter referred to as "Equation 7"), where the open-loop transfer function $G_{VC}(s)$ is given by Equation 6 (hereinafter referred to as "Equation 6"). In Equations 6 and 7, M represents the motor characteristic, where $M=M_1$ when the mechanical model is represented by the rigid-body system model, and $M=M_2$ when the mechanical model is represented by the two-inertia system model.

$$G_{VO}(s) = C_V(s)M = K_V \frac{(K_1 + K_2 s)}{s} M \qquad \text{[Equation 6]}$$

$$G_{VC}(s) = \frac{K_V \dfrac{K_1 + K_2 s}{s} M}{1 + K_V \dfrac{K_1 + K_2 s}{s} M} \qquad \text{[Equation 7]}$$

In the case of the velocity P control, the closed-loop transfer function $G_{VC}(s)$ for the velocity control loop is obtained by setting $K_1=0$ and $K_2=1$ in Equation 7, resulting in Equation 8 (hereinafter referred to as "Equation 8").

$$G_{VC}(s) = \frac{K_V M}{1 + K_V M} \qquad \text{[Equation 8]}$$

Next, the predetermined requirement will be described. (Case where Predetermined Requirement is Response Frequency of Position Control)

When the transfer function is a rational function of s, and the command a is a sine wave with a frequency ω, the control variable b will also become a sine wave with the frequency ω. In this case, the amplitude ratio between the command a and the control variable b is referred to as the frequency response gain at the frequency ω. The frequency response gain of the closed-loop transfer function $G_C(s)$ can be calculated by replacing s with jω in Equation 9 (hereinafter referred to as "Equation 9"). The unit is decibels (dB).

$$20 \log |G_C(j\omega)| \qquad \text{[Equation 9]}$$

In general, the frequency response gain of a closed-loop transfer function is near 0 dB when the frequency response gain of the open-loop transfer function is 0 dB or higher. The case where the frequency response gain of the closed-loop transfer function is near 0 dB (amplitude ratio of 1) means that the control variable b follows the command a. Therefore, the frequency at which the frequency response gain of the closed-loop transfer function intersects 0 dB to −3 dB (amplitude ratio of 1/square root of 2) or becomes local maximum is referred to as the response frequency of the control. The frequency at which the frequency response gain of the open-loop transfer function intersects 0 dB is referred to as the response frequency of the control.

By replacing s with jω in the transfer function $G_{PC}(s)$ of Equation 5, Equation 10 (hereinafter referred to as "Equation 10") is obtained, and the response frequency $\omega=K_P$ becomes the response frequency of position control where $20 \log |G(j\omega)| = -3$ dB.

$$|G_{PC}(j\omega)| = \frac{K_P}{\sqrt{\omega^2 + K_P^2}} \qquad \text{[Equation 10]}$$

(Case where Predetermined Requirement is Response Frequency of Velocity Control)

When the control characteristic C is the velocity P control and the motor characteristic M is based on the two-inertia system model, the open-loop transfer function of the velocity control loop is given by Equation 11 (hereinafter referred to as "Equation 11").

$$G_{VO}(s) = \frac{K_V}{J_M s} \frac{(s^2 + \omega_O^2)}{(s^2 + \omega_P^2)} \qquad \text{[Equation 11]}$$

Figure 7:
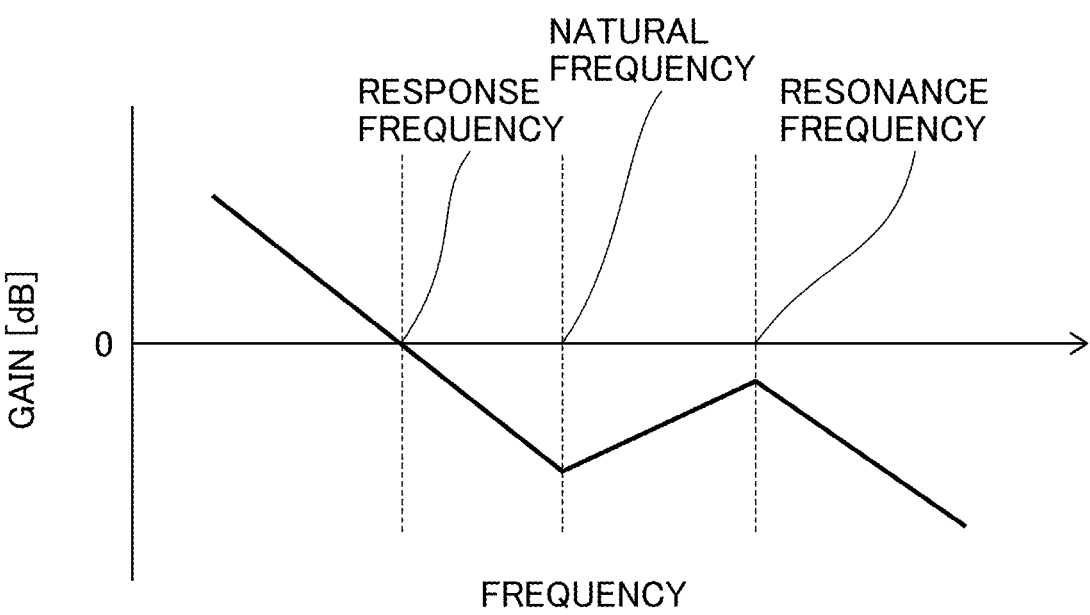
FIG. 7 is a characteristic diagram schematically illustrating the frequency response gain of a transfer function.

The frequency response gain of the transfer function in Equation 11 is schematically illustrated by the gain plot in FIG. 7. In FIG. 7, the horizontal axis is on a logarithmic scale of frequency. The point where the frequency response gain intersects 0 dB is the response frequency, the point where the frequency response gain reaches the local minimum value is the natural frequency, and the point where the frequency response gain reaches the local maximum value is the resonance frequency.

As illustrated in FIG. 7, in general, the relationship between the frequencies is as follows: resonance frequency>natural frequency>response frequency of velocity control. This relationship also holds for the velocity PI control. In a case where the frequency ω is no greater than the response frequency of velocity control, the relationship is as follows: resonance frequency $\omega_P$>natural frequency $\omega_O$>frequency ω ($\omega_P$>$\omega_O$>>ω), resulting in $\omega_P^2$>$\omega_O^2$, thus, the term $s^2$ in Equation 2 may be ignored. By ignoring the term $s^2$, Equation 2 becomes equivalent to Equation 1. Therefore, when considering the response frequency of velocity control, Equation 1 can be used, representing the rigid-body system model as the motor characteristic M. (Case of Velocity PI Control)

Considering the velocity PI control as the control characteristic C and using the rigid-body system model as the motor characteristic M, Equation 7 is expressed as Equation 12 (hereinafter referred to as "Equation 12"), $$G_{VC}(s) = \frac{\left(K_V \dfrac{K_1 + K_2 s}{s} \dfrac{1}{(1 + R)J_M s}\right)}{\left(1 + K_V \dfrac{K_1 + K_2 s}{s} \dfrac{1}{(1 + R)J_M s}\right)} = \qquad \text{[Equation 12]}$$

$$\frac{K_V K_2 s + K_V K_1}{(1 + R)J_M s^2 + K_V K_2 s + K_V K_1}$$

By replacing s with jω in Equation 12, Equation 12 is expressed as Equation 13 (hereinafter referred to as "Equation 13").

$$G_{VC}(j\omega) = \frac{K_V K_2 \omega j + K_V K_1}{K_V K_2 \omega j + K_V K_1 - (1+R)J_M \omega^2} \quad \text{[Equation 13]}$$

The frequency response gain is given by Equation 14 (hereinafter referred to as "Equation 14") using Equation 13.

$$20\log_{10}\frac{|K_V K_2 \omega j + K_V K_1|}{\left|K_V K_2 \omega j + K_V K_1 - (1+R)J_M \omega^2\right|} = \quad \text{[Equation 14]}$$

$$10\log_{10}\frac{(K_V K_2 \omega)^2 + (K_V K_1)^2}{(K_V K_2 \omega)^2 + \left\{K_V K_1 - (1+R)J_M \omega^2\right\}^2}$$

In Equation 14, since the frequency response gain remains 0 dB or higher up to the values of Equation 15 (hereinafter referred to as "Equation 15") at which the absolute values of the denominator and numerator are equal, the frequency ω of Equation 15 is used as the response frequency of the velocity PI control.

$$\omega = \sqrt{\frac{2K_V K_1}{(1+R)J_M}} \quad \text{[Equation 15]}$$

Figure 8:
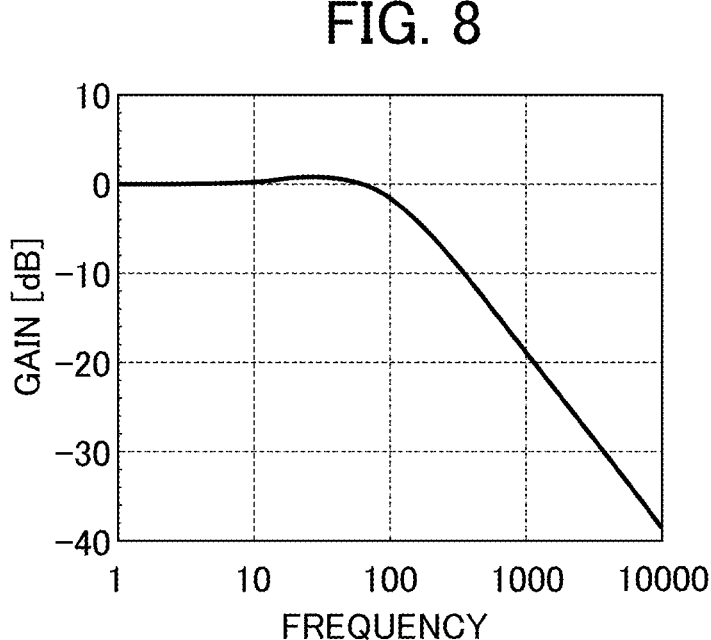
FIG. 8 is a characteristic diagram illustrating an example of the frequency response gain of velocity PI control.

FIG. 8 is a characteristic diagram illustrating an example of the frequency response gain for the velocity PI control. (Case of Velocity P Control)

Considering the velocity P control as the control characteristic C and using the rigid-body system model as the motor characteristic M, the frequency response gain is obtained by setting $K_1=0$ and $K_2=1$ in Equation 14, resulting in Equation 16 (hereinafter referred to as "Equation 16").

$$20\log_{10}\frac{|K_V \omega j|}{\left|K_V \omega j - (1+R)J_M \omega^2\right|} = 20\log_{10}\frac{K_V}{|K_V + j(1+R)J_M \omega|} \quad \text{[Equation 16]}$$

In Equation 16, the value of ω in Equation 17 (hereinafter referred to as "Equation 17"), where $20\log|G(j\omega)|=-3$ dB, is the response frequency of the velocity P control, $$\omega = \frac{K_V}{(1+R)J_M} \quad \text{[Equation 17]}$$

Figure 9:
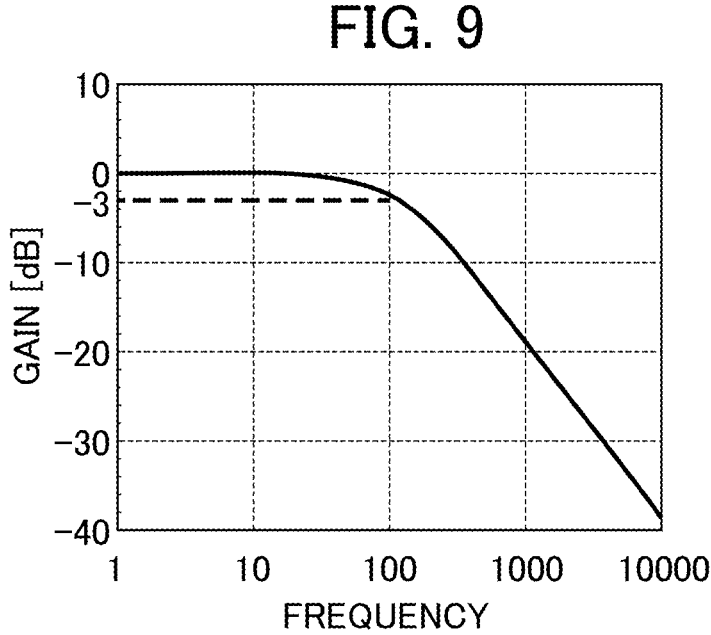
FIG. 9 is a characteristic diagram illustrating an example of the frequency response gain of velocity P control.

FIG. 9 is a characteristic diagram illustrating an example of the frequency response gain for the velocity P control. (Case where Predetermined Requirement is Natural Frequency or Resonance Frequency of Machine Tool)

Figure 3:
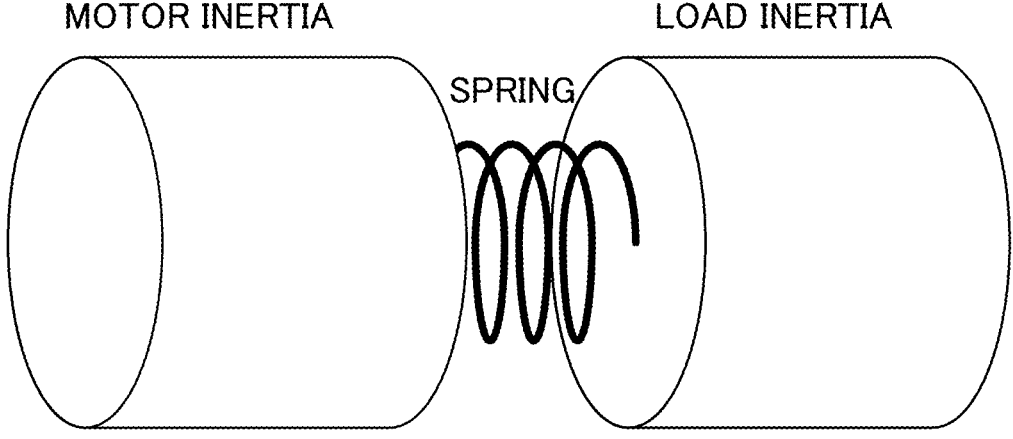
FIG. 3 is a diagram illustrating the driving unit and the driven unit of a machine tool using a two-inertia system model.

As mentioned earlier, when the motor, which serves as the driving unit of the machine tool and the driven unit, are represented by the two-inertia system model illustrated in FIG. 3, and the motor information includes the motor inertia $J_M$, the natural frequency ω, and the resonance frequency $\omega_P$, the motor characteristic $M_2$ is given by Equation 2. In Equation 2, the natural frequency $\omega_O$ and the resonance frequency op are given by Equation 3 using the motor inertia $J_M$, the inertia ratio R, and the spring constant $K_S$ of the spring element between the motor inertia and the load inertia. The natural frequency $\omega_O$ and the resonance frequency ω_P represent the natural frequency and the resonance frequency of the machine tool.

The following describes the method by which the transfer characteristic calculation unit 214 calculates the transfer characteristic of the machine tool to satisfy the predetermined requirement. The transfer characteristic generation unit 210 included in the machining simulation device 200 operates as application software on a personal computer, and includes the user interface illustrated in FIG. 10.

Figure 10:
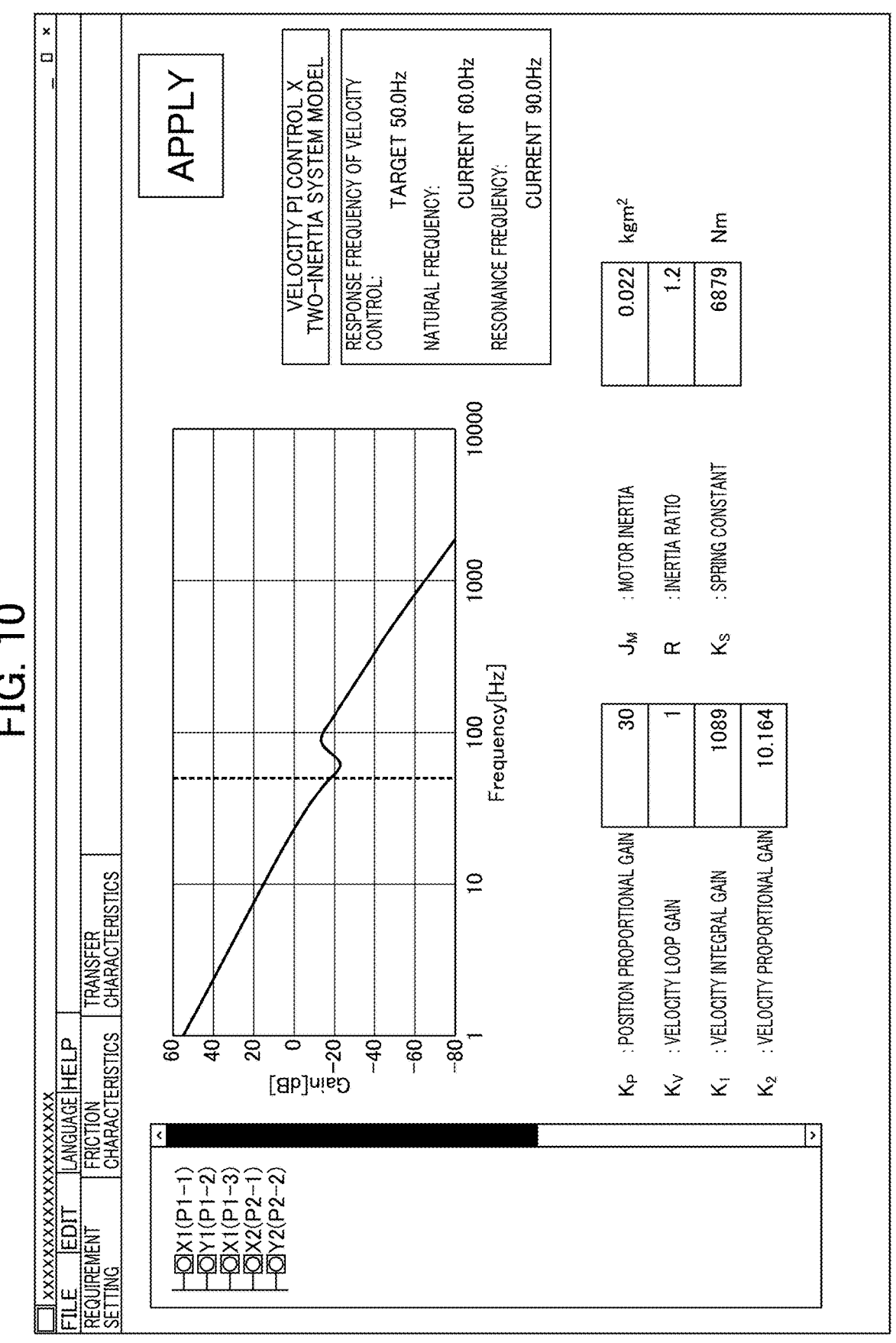
FIG. 10 is a diagram illustrating an example of a user interface displayed on a display screen of a personal computer.

FIG. 10 is a diagram illustrating an example of a user interface displayed on a display screen of a personal computer. As illustrated in FIG. 10, the display screen displays the control parameters such as the position control proportional gain $K_P$, the velocity loop gain $K_V$, the velocity control integral gain $K_1$, and the velocity control proportional gain $K_2$, as well as the motor information such as the motor inertia $J_M$, the inertia ratio R, and the spring constant $K_S$, which are read from the control information acquired by the control information acquisition unit 211. Specifically, as illustrated in FIG. 10, the position control proportional gain $K_P$ is 30, the velocity loop gain $K_V$ is 1, the velocity control integral gain $K_1$ is 1089, the velocity control proportional gain $K_2$ is 10.164, the motor inertia $J_M$ is 0.022 [kgm$^2$], the inertia ratio R is 1.2, and the spring constant $K_S$ is 6878 [Nm], which are displayed on the screen. These control parameters and motor information are changed based on the predetermined requirements input by the user. On the left side of the screen, a region is displayed where the user can select the axis for which they wish to generate the model from the plurality of axes of the machine tool.

The user sets the predetermined requirement via an input form (not illustrated). For example, in FIG. 10, the result of setting the "response frequency of the velocity control; target 50 Hz" is displayed, with a dashed line on the graph indicating 50 Hz.

When the user presses the "Apply" button as illustrated in FIG. 10, the transfer characteristic calculation unit 214 changes the control characteristic or motor characteristic in accordance with the predetermined requirement and provides the generated transfer characteristic to the simulation execution unit 220. The details of the operation for changing the control characteristic or motor characteristic in accordance with the predetermined requirement will be described later.

The display screen displays the frequency response of the open-loop transfer function obtained from the results of reading the control information. When the user presses the "Apply" button and the transfer characteristic calculation unit 214 changes the control characteristic or motor characteristic in accordance with the predetermined requirement and generates the transfer function, the frequency response is updated based on the generated transfer characteristic. Instead of updating the frequency response, the frequency response based on the generated transfer characteristic may be overlaid. Furthermore, the frequency response may also be based on the transfer function $G_C(s)$, which takes feedback into consideration.

The timing at which the transfer characteristic calculation unit 214 changes the control characteristic or motor characteristic or alters the display of the frequency response does not have to be when the "Apply" button is pressed, and may be the timing at which the user changes the predetermined requirement via the input form.

The numerical values illustrated in FIG. 10 may be rounded to an appropriate number of decimal places; however, the number of decimal places does not hold special significance and is not particularly limited. In FIG. 10, although the unit of motor inertia is represented as inertia [kgm$^2$] assuming a rotary motor, the unit of inertia may be mass [kg] in the case of using a linear motor. Similarly, although the unit of [Nm] is used for the spring constant assuming a torsional spring, the unit may be [N/m] in the case of using a tension-compression spring.

The natural frequency $\omega_O$ and the resonance frequency $\omega_P$ in Equation 3, the frequency $\omega$ in Equation 10, the frequency $\omega$ in Equation 15, and the frequency $\omega$ in Equation 16 are angular frequencies [rad/s]. On the other hand, although the unit of the frequencies illustrated in the screen display in FIG. 10 and the unit of the frequencies illustrated as the predetermined requirements are Hz, the unit may be rad/s.

The following describes an example of the operation where the transfer characteristic calculation unit 214 changes the control characteristic or motor characteristic to calculate the transfer characteristic of the machine tool to satisfy the predetermined requirement.

(1) Example of Changing the Position Control Proportional Gain $K_P$ to Satisfy the Predetermined Requirement "Response Frequency of Position Control"

In a case where the user specifies 10 Hz as the response frequency of position control, the angular frequency for 10 Hz is $10 \times 2\pi (\text{rad/s}) = 62.832$ (rad/s). As described using Equation 10, since the position control proportional gain $K_P$ equals the response frequency of position control, the position control proportional gain $K_P$ is set to $K_P = 10 \times 2\pi = 62.832$. To satisfy the predetermined requirement "response frequency of position control", the position control proportional gain $K_P$, which is the control characteristic $C_P$, is changed from 30 (as illustrated in FIG. 10) to 62.832.

(2) Example of Changing the Velocity Loop Gain $K_V$ to Satisfy the Predetermined Requirement "Response Frequency of Velocity Control" (in the Case of Velocity PI Control)

The left-hand side of Equation 15 is changed to fc[Hz], resulting in Equation 18 (hereinafter referred to as "Equation 18").

$$f_C = \frac{1}{2\pi}\sqrt{\frac{2K_V K_1}{(1+R)J_M}} \qquad \text{[Equation 18]}$$

In Equation 18, the motor inertia $J_M$ remains unchanged. Generally, in PI control, the velocity control integral gain $K_1$ and the velocity control proportional gain $K_2$ are adjusted in balance; however, here, the velocity control integral gain $K_1$ remains unchanged. The user may choose whether to change either the velocity loop gain $K_V$ or the inertia ratio R via a detailed settings option (not illustrated in FIG. 10). Alternatively, the detailed settings may be configured to prioritize one over the other within the allowable range, and in a case where the predetermined requirement cannot be satisfied within this range, the other may be changed. The following describes an example where only the velocity loop gain $K_V$ is adjusted to satisfy the predetermined requirement of a 50 Hz response frequency for velocity control. By solving Equation 18 for the velocity loop gain $K_V$, the velocity loop gain $K_V$ is given by Equation 19 (hereinafter referred to as "Equation 19").

$$K_V = \frac{2\pi^2 f_C^2(1+R)J_M}{K_1} = \frac{2\pi^2 \times 50^2 \times 2.2 \times 0.022}{1089} = 2.193 \qquad \text{[Equation 19]}$$

In this manner, in order to satisfy the predetermined requirement "response frequency of velocity control", the velocity loop gain $K_V$, which is part of the control characteristic $C_V$, is changed from 1 to 2.191, and the control characteristic $C_V$ is adjusted accordingly.

(3) Example of Changing the Velocity Loop Gain $K_V$ to Satisfy the Predetermined Requirement "Response Frequency of Velocity Control" (in the Case of Velocity P Control)

The left-hand side of Equation 17 is changed to fc [Hz], resulting in Equation 20 (hereinafter referred to as "Equation 20").

$$f_C = \frac{K_V}{2\pi(1+R)J_M} \qquad \text{[Equation 20]}$$

In Equation 20, the motor inertia $J_M$ remains unchanged. This example discusses the case of satisfying the predetermined requirement "response frequency of velocity control" (50 Hz) by changing the inertia ratio R. By solving Equation 20 for the inertia ratio R, the inertia ratio R is given by Equation 21 (hereinafter referred to as "Equation 21").

$$R = \frac{K_V}{2\pi J_M f_C} - 1 = \frac{1}{2\pi \times 0.022 \times 50} = -0.855 \qquad \text{[Equation 21]}$$

The inertia ratio R can take a value of 0 in the absence of load inertia but cannot take negative numbers. Therefore, assuming R=0 and solving Equation 20 for $K_V$, the velocity loop gain $K_V$ is given by Equation 22 (hereinafter referred to as "Equation 22").

$$K_V = 2\pi f_C J_M = 2\pi \times 50 \times 0.022 = 6.912 \qquad \text{[Equation 22]}$$

In this manner, in order to satisfy the predetermined requirement "response frequency of velocity control", the inertia ratio R of the motor characteristic $M_1$ is changed from 1.2 to 0, and the velocity loop gain $K_V$ of the control characteristic $C_V$ is changed from 1 to 6.912, thereby adjusting both the motor characteristic $M_1$ and the control characteristic $C_V$.

(4) Example of Changing the Spring Constant $K_S$ to Satisfy the Predetermined Requirement "Natural Frequency of the Machine Tool" By solving Equation 3 for the spring constant $K_S$, the natural frequency $\omega_O$ is given by Equation 23 (hereinafter referred to as "Equation 23").

$$K_S = RJ_M\omega_O^2 \qquad \text{[Equation 23]}$$

In a case where the predetermined requirement is a natural frequency of 45 Hz, the spring constant $K_S$ represented in Equation 24 (hereinafter referred to as "Equation 24") is given by Equation 23.

$$K_S = RJ_M\omega_O^2 = 1.2 \times 0.022 \times (2 \times \pi \times 45)^2 = 2111[\text{Nm}] \qquad \text{[Equation 24]}$$

In this manner, in order to satisfy the predetermined requirement "Natural Frequency of the Machine Tool", the spring constant $K_S$ of the motor characteristic is changed from 6878 [Nm] (as illustrated in FIG. 10) to 2111 [Nm], and the motor characteristic $M_2$ is changed accordingly.

(5) Example of Changing the Spring Constant $K_S$ to Satisfy the Predetermined Requirement "Resonance Frequency Between the Driving Unit and the Driven Unit of the Machine Tool"

By solving Equation 3 for the spring constant $K_S$, the resonance frequency op is given by Equation 25 (hereinafter referred to as "Equation 25").

$$K_S = J_M \omega_P^2 \frac{R}{1+R} \qquad \text{[Equation 25]}$$

In a case where the predetermined requirement is a resonance frequency of 80 Hz, the spring constant $K_S$ represented in Equation 26 (hereinafter referred to as "Equation 26") is given by Equation 25.

$$K_S = J_M \omega_P^2 \frac{R}{1+R} = 0.022 \times (2 \times \pi \times 80)^2 \frac{1.2}{2.2} = 3032 [\text{Nm}] \qquad \text{[Equation 26]}$$

In this manner, in order to satisfy the predetermined requirement "Resonance Frequency of the Machine Tool", the spring constant $K_S$ of the motor characteristic is changed from 6878 [Nm] (as illustrated in FIG. 10) to 3032 [Nm], and the motor characteristic $M_2$ is changed accordingly.

In the above examples (4) and (5), the spring constant $K_S$ was changed; however, the inertia ratio R may be changed instead. The user may choose whether to change either the spring constant $K_S$ or the inertia ratio R via a detailed settings option (not illustrated in FIG. 10). Alternatively, the detailed settings may be configured to prioritize one over the other within the allowable range, and in a case where the predetermined requirement cannot be satisfied within this range, the other may be changed.

The transfer characteristic calculation unit 214 can change at least one of the motor inertia, the inertia ratio, the spring constant, the position control proportional gain, the velocity loop gain, the velocity control integral gain, or the velocity control proportional gain such that the transfer characteristic satisfies the predetermined requirement. In a case where a rigid-body system model considering the load inertia as a motor characteristic is not used (i.e., R=0), the transfer characteristic calculation unit 214 can use a rigid-body system model that adds load inertia to motor inertia such that the transfer characteristic satisfies the predetermined requirement. In a case where a rigid-body system model is used as a motor characteristic, the transfer characteristic calculation unit 214 can use a two-inertia system model that connects the motor inertia and the load inertia with a spring element such that the transfer characteristic satisfies the predetermined requirement.

In the described embodiment, the control characteristic and the motor characteristic can be refined by considering more elements, leading to higher precision in the simulation results. For example, in academic literature, dampers (for damping) are considered when deriving the two-inertia system model first. However, even if the simulation execution unit considers dampers or nonlinearity, dampers or nonlinearity may be ignored in calculation for changing a control characteristic or obtaining a motor characteristic in the transfer characteristic calculation unit. This is because dampers and nonlinearity are less sensitive to frequency characteristics such as response frequency, natural frequency, and resonance frequency compared to control gains, inertia ratios, and spring constants.

Each configuration of the machining simulation device 200 has been described above. Next, the machining simulation method will be described. In the following description, the machining simulation method is described as being executed using the machining simulation device 200; however, the method may also be executed on devices other than the machining simulation device 200.

Figure 11:
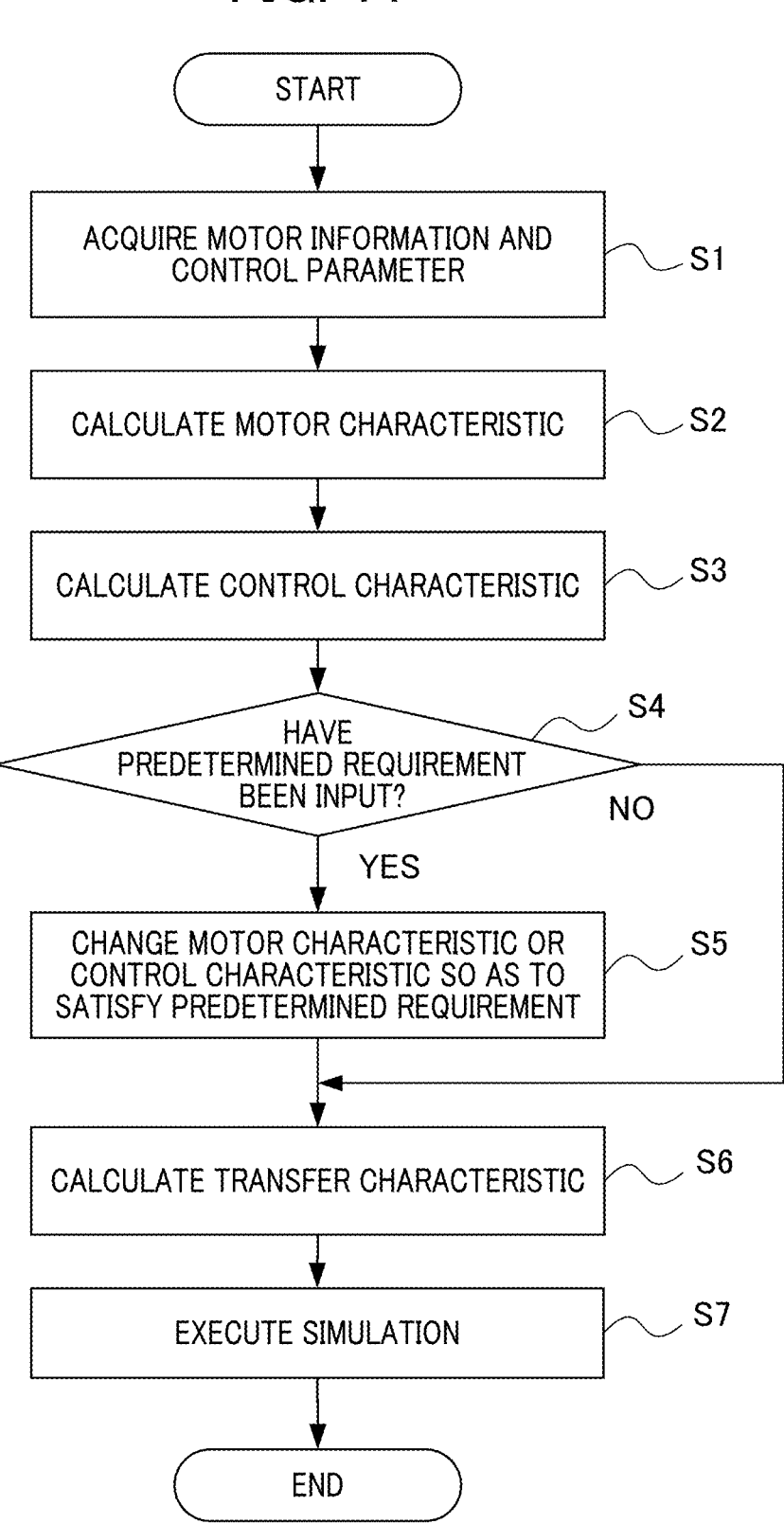
FIG. 11 is a flowchart illustrating the operation of the machining simulation device.

FIG. 11 is a flowchart illustrating the operation of the machining simulation device.

In Step S1, the control information acquisition unit 211 acquires control information that includes motor information and a control parameter. The motor information includes at least one of the motor inertia, the inertia ratio, or the spring constant, all caused by the motor. The control parameter includes, for example, at least one of the position control proportional gain $K_P$ of the position control unit, the velocity loop gain $K_V$, the velocity control integral gain $K_1$ of the velocity control unit, or the velocity control proportional gain $K_2$ of the velocity control unit, which are included in the motor control system of the control unit 100.

In Step S2, the motor characteristic calculation unit 212 calculates the motor characteristic, based on the motor information.

In Step S3, the control characteristic calculation unit 213 calculates the control characteristic of the motor control system, based on the control parameter. Step S3 may be executed before Step S2, or may be executed in parallel with Step S2.

In Step S4, the transfer characteristic calculation unit 214 determines whether the predetermined requirement have been input. If the requirement has been input, the processing proceeds to Step S5; if the requirement has not been input, the processing proceeds to Step S6.

In Step S5, the transfer characteristic calculation unit 214 changes at least one of the motor characteristic calculated by the motor characteristic calculation unit 212 or the control characteristic calculated by the control characteristic calculation unit 213 so as to satisfy the predetermined requirement thus input.

In Step S6, if at least one of the motor characteristic or the control characteristic has been changed in Step S5, the transfer characteristic calculation unit 214 calculates the transfer characteristic of the machine tool, based on at least one of the motor characteristic or control characteristic thus changed. If the predetermined requirement has not been input in Step S4, the transfer characteristic calculation unit 214 calculates the transfer characteristic of the machine tool, based on at least one of the motor characteristic calculated by the motor characteristic calculation unit 212 or the control characteristic calculated by the control characteristic calculation unit 213.

In Step S7, the simulation execution unit 220 uses the calculated transfer function to simulate the control of the machine tool control device 100 based on the machining program, the behavior of the motor as the driving unit and the driven unit, and the feedback control of the control unit 100 based on the position information of the driving unit and the driven unit, and outputs the position information of each shaft as the simulation result.

The components of the machining simulation device described in the embodiment above can be implemented by hardware, software, or a combination thereof. Implementation by software means implementation by a computer that reads and executes a program. In order to implement the components of the machining simulation device by software or a combination thereof, the machining simulation device includes a processor such as a CPU (Central Processing Unit). The processor functions as the execution unit. The machining simulation device may include a plurality of processors operating in parallel. The machining simulation device also includes auxiliary storage devices such as HDDs (Hard Disk Drives) that store various programs such as application software or an OS (Operating System), and main storage devices such as RAM (Random Access Memory), which store the program and data temporarily required on the program during the execution of the functions and operations of the machining simulation device as described in FIGS. 1 and 6. The machining simulation device may include a plurality of main storage devices.

With the machining simulation device, the processor reads the application software or OS from the auxiliary storage device, loads the read application software or OS into the main storage device, and executes computation based on the application software or OS. Various hardware components of the machining simulation device are controlled based on the computation results. In this manner, the functional blocks of the present embodiment are implemented.

The components of the machining simulation device may also be implemented by hardware such as electronic circuits. When configuring the machining simulation device by hardware, some or all of the functions of the components of the machining simulation device may be implemented by ICs (Integrated Circuits) such as ASICs (Application Specific Integrated Circuits), gate arrays, FPGAs (Field Programmable Gate Arrays), or CPLDs (Complex Programmable Logic Devices).

Programs can be stored and supplied to a computer using various types of non-transitory computer-readable media. Non-transitory computer-readable media include various types of tangible storage media. Examples of non-transitory computer-readable media include magnetic storage media (such as hard disk drives), magneto-optical storage media (such as magneto-optical disks), CD-ROMs (Read Only Memory), CD-Rs, CD-RWs, and semiconductor memory (such as mask ROMS, PROMS (Programmable ROMs), EPROMS (Erasable PROMs), flash ROMs, and RAM (random access memory)). Programs may also be supplied to the computer using various types of transitory computer-readable media.

The effect of the machining simulation device and the machining simulation method described in the above embodiment is that the transfer function of the machine tool can be achieved without requiring the collection of data during test operation of the machine tool and without requiring specialized knowledge for calculating the transfer characteristic.

Although the present disclosure has been described above, the present disclosure is not limited to the individual embodiments and modifications described above. Various additions, replacements, modifications, partial deletions, etc., can be made without departing from the scope of the disclosure, as derived from the content of the claims and their equivalents. The embodiments and modifications may also be implemented in combination. For example, the order of operations and the sequence of processing described as examples in the above embodiments, and are not limited thereto.

The following additional notes are further disclosed regarding the embodiment above:

(Additional Note 1)

A machining simulation device (200) includes: a transfer characteristic generation unit (210) that generates a transfer characteristic of a machine tool; and a simulation execution unit (220) that simulates behavior of the machine tool using the transfer characteristic, in which the transfer characteristic generation unit includes: a control information acquisition unit (211) that acquires control information including motor information of the machine tool and a control parameter of the motor control system of the machine tool from a storage unit; a motor characteristic calculation unit (212) that calculates a motor characteristic, based on the motor information; a control characteristic calculation unit (213) that calculates a control characteristic of the motor control system, based on the control parameter; and a transfer characteristic calculation unit (214) that calculates the transfer characteristic satisfying a predetermined requirement, based on the motor characteristic and the control characteristic, in which the predetermined requirement includes at least one of the response frequency of position control, the response frequency of velocity control, the natural frequency of the machine tool, or the resonance frequency between the driving unit and the driven unit of the machine tool.

(Additional Note 2)

The machining simulation device as described in additional note 1, in which the motor information includes at least one of motor inertia, an inertia ratio, or a spring constant, all caused by the motor; and the control parameter includes at least one of position control proportional gain, velocity loop gain, velocity control integral gain, or velocity control proportional gain.

(Additional Note 3)

The machining simulation device as described in additional note 2, in which the motor characteristic calculation unit (212) calculates the motor characteristic using a rigid-body system model including the motor inertia and the inertia ratio, or a two-inertia system model including the motor inertia, the inertia ratio, and the spring constant.

(Additional Note 4)

The machining simulation device as described in additional note 2, in which the control characteristic calculation unit (213) calculates the control characteristic using the position control proportional gain.

(Additional Note 5)

The machining simulation device as described in additional note 2, in which the control characteristic calculation unit (213) calculates the control characteristic using the velocity loop gain, or the velocity loop gain, the velocity control integral gain, and the velocity control proportional gain.

(Additional Note 6)

The machining simulation device as described in additional note 1, in which the motor characteristic includes at least one of motor inertia, an inertia ratio, or a spring constant; the control characteristic includes at least one of position control proportional gain, velocity loop gain, velocity control integral gain, or velocity control proportional gain; and the transfer characteristic calculation unit (214) changes at least one of the motor inertia, the inertia ratio, the spring constant, the position control proportional gain, the velocity loop gain, the velocity control integral gain, or the velocity control proportional gain such that the transfer characteristic satisfies the predetermined requirement.

(Additional Note 7)

The machining simulation device as described in additional note 1, in which the transfer characteristic calculation unit (214) adds load inertia to motor inertia, or connects the motor inertia and the load inertia with a spring element, such that the transfer characteristic satisfies the predetermined requirement.

(Additional Note 8)

A machining simulation method causing a computer to execute processing including: processing of calculating a motor characteristic, based on motor information of a machine tool; processing of calculating a control characteristic of a motor control system, based on a control parameter of the motor control system of the machine tool; processing of calculating a transfer characteristic satisfying a predetermined requirement, based on the motor characteristic and the control characteristic; and processing of simulating behavior of the machine tool using the transfer characteristic, in which the predetermined requirement includes at least one of a response frequency of position control, a response frequency of velocity control, a natural frequency of the machine tool, or a resonance frequency between a driving unit and a driven unit of the machine tool.

EXPLANATION OF REFERENCE NUMERALS

10: machining simulation system
100: machine tool control device
101: storage unit
200: machining simulation device
210: transfer characteristic generation unit
211: control information acquisition unit
212: motor characteristic calculation unit
213; control characteristic calculation unit
214: transfer characteristic calculation unit
220: simulation execution unit

The invention claimed is:

1. A machining simulation device, comprising:

a first memory configured to store a program; and a processor configured to execute the program and control the machining simulation device to:

acquire control information, including motor information of the machine tool and a control parameter of a motor control system of the machine tool, from a second memory of a controller of the machine tool;

calculate a motor characteristic, based on the motor information;

calculate a control characteristic of the motor control system, based on the control parameter;

display a user interface on a display screen, the user interface corresponding to displaying the motor characteristic and the control characteristic and receiving a predetermined requirement from a user;

modify the motor characteristic and the control characteristic in accordance with the predetermined requirement;

calculate a transfer function representing the transfer characteristic of the machine tool based on the modified motor characteristic and control characteristic; and simulate behavior of the machine tool using the calculated transfer function;

wherein the transfer function calculated includes the modified motor characteristic and control characteristic, wherein the predetermined requirement includes at least one of a response frequency of position control, a response frequency of velocity control, a natural frequency of the machine tool, or a resonance frequency between a driving unit and a driven unit of the machine tool.

2. The machining simulation device according to claim 1, wherein the motor information includes at least one of motor inertia, an inertia ratio, or a spring constant, all caused by a motor, and the control parameter includes at least one of position control proportional gain, velocity loop gain, velocity control integral gain, or velocity control proportional gain.

3. The machining simulation device according to claim 2, wherein the processor controls the machining simulation device to calculate the motor characteristic using a rigid-body system model including the motor inertia and the inertia ratio, or a two-inertia system model including the motor inertia, the inertia ratio, and the spring constant.

4. The machining simulation device according to claim 2, wherein the processor controls the machining simulation device to calculate the control characteristic using the position control proportional gain.

5. The machining simulation device according to claim 2, wherein the processor controls the machining simulation device to calculate the control characteristic using the velocity loop gain, or the velocity loop gain, the velocity control integral gain, and the velocity control proportional gain.

6. The machining simulation device according to claim 1, wherein the motor characteristic includes at least one of motor inertia, an inertia ratio, or a spring constant, the control characteristic includes at least one of position control proportional gain, velocity loop gain, velocity control integral gain, or velocity control proportional gain, and the processor controls the machining simulation device to change at least one of the motor inertia, the inertia ratio, the spring constant, the position control proportional gain, the velocity loop gain, the velocity control integral gain, or the velocity control proportional gain such that the transfer function satisfies the predetermined requirement.

7. The machining simulation device according to claim 1, wherein the processor controls the machining simulation device to add load inertia to motor inertia, or connects the motor inertia and the load inertia with a spring element, such that the transfer function satisfies the predetermined requirement.

8. A machining simulation method causing a computer to execute processing comprising:

calculating a motor characteristic, based on motor information of a machine tool acquired from a memory of a controller of the machine tool;

calculating a control characteristic of a motor control system, based on a control parameter of the motor control system of the machine tool acquired from the memory;

displaying a user interface on a display screen, the user interface corresponding to displaying the motor characteristic and the control characteristic and receiving a predetermined requirement from a user;

modifying the motor characteristic and the control characteristic in accordance with the predetermined requirement;

calculating a transfer function representing a transfer characteristic of the machine tool satisfying the predetermined requirement, based on the modified motor characteristic and control characteristic; and simulating behavior of the machine tool using the transfer function, wherein the transfer function includes the modified at least one of the motor characteristic er the and control characteristic, wherein the predetermined requirement includes at least one of a response frequency of position control, a response frequency of velocity control, a natural frequency of the machine tool, or a resonance frequency between a driving unit and a driven unit of the machine tool.

\* \* \* \* \*